United States Patent
Fedirchuk et al.

(10) Patent No.: US 7,199,991 B2
(45) Date of Patent: Apr. 3, 2007

(54) ELECTRICAL BUS PROTECTION METHOD & APPARATUS

(75) Inventors: David J. Fedirchuk, Ile des Chenes (CA); Gang Li, Winnipeg (CA); Zhiying Zhang, Winnipeg (CA); Dean S. Ouellette, Winnipeg (CA)

(73) Assignee: Nxt Phase T & D Corporation, Vancouver (CA)

( * ) Notice: Subject to any disclaimer, the term of this patent is extended or adjusted under 35 U.S.C. 154(b) by 603 days.

(21) Appl. No.: 10/607,737

(22) Filed: Jun. 26, 2003

(65) Prior Publication Data

US 2004/0057175 A1    Mar. 25, 2004

Related U.S. Application Data

(60) Provisional application No. 60/411,090, filed on Sep. 16, 2002, provisional application No. 60/392,651, filed on Jun. 27, 2002.

(51) Int. Cl.
*H02H 3/00*    (2006.01)

(52) U.S. Cl. .......................................... 361/115; 361/62
(58) Field of Classification Search .................. 361/62, 361/115

See application file for complete search history.

(56) References Cited

U.S. PATENT DOCUMENTS

| 4,623,949 | A | * | 11/1986 | Salowe et al. ................ 361/63 |
| 4,751,604 | A | * | 6/1988 | Wilkinson .................... 361/68 |
| 4,862,308 | A | * | 8/1989 | Udren ......................... 361/45 |
| 6,442,010 | B1 | * | 8/2002 | Kasztenny et al. ........... 361/63 |

* cited by examiner

*Primary Examiner*—Stephen W. Jackson
(74) *Attorney, Agent, or Firm*—Robert A. Pajak

(57) ABSTRACT

A protection relay for a power line system that employs current transformers for detecting current on a bus is provided with a fault trip scheme that includes transformer current saturation detection so as to avoid false tripping due to temporary transformer current saturation.

7 Claims, 3 Drawing Sheets

1. bus being protected (one of three phases shown)
2. feeder into bus (one of three phases shown)
3. current transformer set (one of three phases shown)
4. connection from current transformer to protective relay (one of three phases shown)
5. protective relay
6. trip signal decision 1. bus being protected (one of three phases shown)
2. feeder into bus (one of three phases shown)
3. current transformer set (one of three phases shown)
4. connection from current transformer to protective relay (one of three phases shown)
5. protective relay
6. trip signal decision

ELECTRICAL BUS PROTECTION METHOD & APPARATUS

RELATED APPLICATION

This application claims the benefit of priority pursuant to 35 USC 119 of provisional patent application entitled, "Electrical Bus Protection Method & Apparatus", having Ser. No. 60/392,651 filed 27 Jun. 2002, and of provisional patent application of same title, having Ser. No. 60/411,090 filed 16 Sep. 2002, the disclosures of these applications are hereby incorporated in their entirety by reference herein.

FIELD OF THE INVENTION

The present invention generally relates to power line systems, and more particularly to an apparatus and method for protecting an electrical power line bus or other electrical conductors having a plurality of power or electrical energy transmission lines that transmit currents. More specifically, the invention relates to a signal processing scheme intended to prevent (block) false tripping by a bus protection protective relay due to miss-information derived from saturated current transformers connected to a bus protection relay.

BACKGROUND OF THE INVENTION

Electrical power transmission line systems are of course well known. An exemplary system is shown and described in U.S. Pat. No. 6,307,703, entitled, "Parallel-Feeder Directional Overcurrent Protection, issued to Hindle, et al, herein incorporated by reference thereto. Many such protection systems are known in the art, as exemplified by U.S. Pat. No. 6,369,996, entitled, "Fault Protection Scheme," issued to Bo, herein incorporated by reference thereto.

Before proceeding, power lines or feeder lines, as used herein, refers to any electrical current transmitting line coupled to the bus for transmitting current either from equipment generators or delivered to equipment loads, and the like.

Bus protection relays are also well known. One example of a bus protection relay is shown and described in the attached product brochure known as "B-PRO," Model 8700/BUS, manufactured by NxtPhase Technologies, SRL (formerly APT Power Technologies), the attached brochure being incorporated herein by reference thereto.

SUMMARY OF THE INVENTION

An object of the present invention is to provide a method and apparatus for protecting an electrical power line bus having a plurality of feeder lines coupled thereto.

Another object of the present invention is to provide a method and apparatus for protecting an electrical power line bus having a plurality of feeder lines, including those connected or coupled to loads and equipment, where each bus is associated with one of a plurality of phase identified transmission lines—commonly a 3-Phase Power Line System.

In accordance with the present invention, monitoring signals representative a respective one of the electrical characteristic of the current associated with each one of the power lines, e.g., feeder or equipment or generator lines, coupled to an electrical power line bus are signal processed in such a manner so as to derive a trip signal indicative of a fault condition so as to protect the bus from damage.

In accordance with the present invention, a protection relay if provided for a power line system for protecting a bus. The bus is provided for transmitting current to and from one or more power lines for receiving and generating power, and where associated with each of the power lines is a current transformer for providing a line signal current representative of current flowing through a respective line. The protection relay is operative for generating a trip signal in response to a detected power signal line fault. In the present invention, the protection relay includes a signal processor responsive to signal line currents for generating a trip signal in response to a detected fault on any one of power lines. Further, means is provided responsive to the signal line currents for detecting current transformer saturation; and selectively generating a blocking signal for blocking the usual trip signal in response to detection of current saturation of the current transformer. In the preferred embodiment of the present invention, current saturation detection is provided by way of monitoring a phase value of a selected harmonic of signals derived from the all of the power line currents, associated with a single bus associated with a single phase.

DETAILED DESCRIPTION OF THE INVENTION

In accordance with the present invention, the bus protection system includes a saturation detector that will detect all CT saturation conditions for external faults and block the differential protection from operating, when this condition occurs. Further the signal processing in accordance with the present invention is intended to be immune to partial or fully offset waveforms, harmonics, fault arcing resistance, capacitive or inductive loads, severity of saturation, speed at which saturation occurs, and CT saturation occurring during only a portion of a detected fault. The saturation detection in accordance with the present invention is intended to not interfere with internal faults (with or without saturation), not affect the operating speed of the bus-protection differential current detection function, and not require any special settings. Further, the bus protection system in accordance with the present invention is intended to be simple to use and may be enabled or disabled. Once enabled, a timer may be set to control how long an external current transformer saturation condition is permitted to block the differential protection—normally this timer may be set to be slightly longer than the maximum clearing time for an external fault.

The signal processing scheme in accordance with the present invention is intended to prevent (block) false tripping by a bus protection protective relay due to miss-information derived from saturated current transformers connected to the relay. In a conventional protection relay, saturated current transformer information may appear to be overall current imbalance—when in fact there is none—and cause a highly undesirable false trip.

Figure 1:
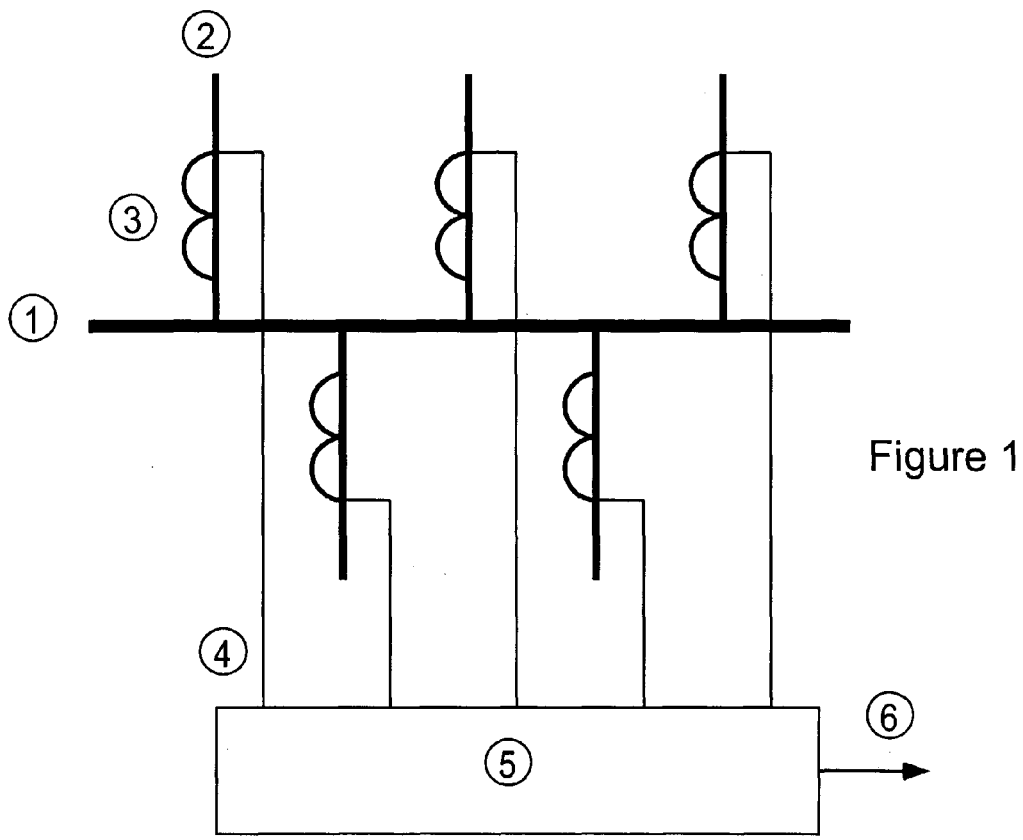
FIG. 1 is a schematic block diagram of a bus protection system for one phase of a multi-phase power system and where a bus in coupled to a plurality of power lines.

FIG. 1 illustrates a protective relay 5 connected to a power system bus1 in a conventional manner. It should be recognized that FIG. 1 illustrates a three phase system. Current transformers (CT) 3 provide current signals associated with a respective one feeder line—only one is numerically identified in the drawing. Protective relay 5 includes signal processing for arriving at a trip decision signal in response to received current signals from the CT is a conventional manner.

Before proceeding, it should be recognized that protection relay 5 includes a variety of electrical components commonly including analog-to-digital transformations, a microprocessor for providing a variety of protective elements for monitoring power line currents derived from the current transformers employing a variety of logically combined algorithms as well known, Such systems are commonly commercially available by Schweitzer Engineering Laboratories, as well as the aforesaid "B-PRO," Model 8700/BUS, manufactured by NxtPhase Technologies, SRL (formerly APT Power Technologies), the associated brochure being incorporated herein by reference thereto.

Figure 2:
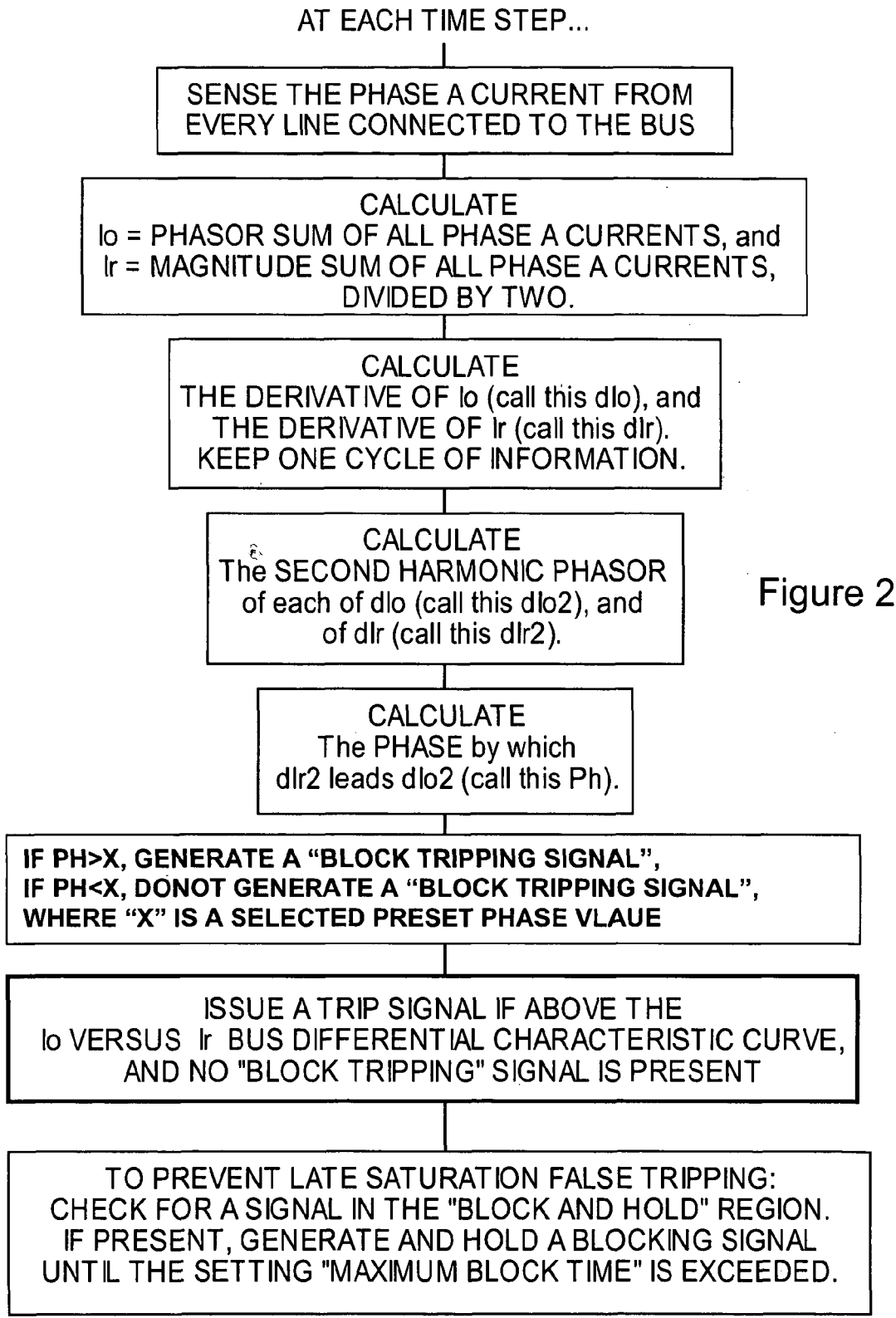
FIG. 2 is a block diagram of the method in accordance with the present invention.

FIG. 2 illustrates a signal processing scheme by way of the block diagram shown therein, and may be incorporated by hardware, firmware, software, and the like, in order to provide the trip decision signal 6. The signal processing system in accordance with the present invention utilizes several derived characteristics of the feeder currents.

In a conventional manner, both the phasor sum of the power line currents associated with the power lines coupled to the bus, and the magnitude sum of these currents are first determined—equations 1. In turn, the derivatives of the phasor sum and magnitude sum signal are determined—equations 2. A harmonic of the derivative expressions, more specifically the second harmonic, is derived—equations 3. In turn the phase between the second harmonics of the derivatives of the phasor sum signal and magnitude sum signal is determined and compared to a selected threshold, e.g., "5"—equations 4. This comparison is then used to generate a block tripping signal, 6 as illustrated in FIG. 1.

Figure 3:
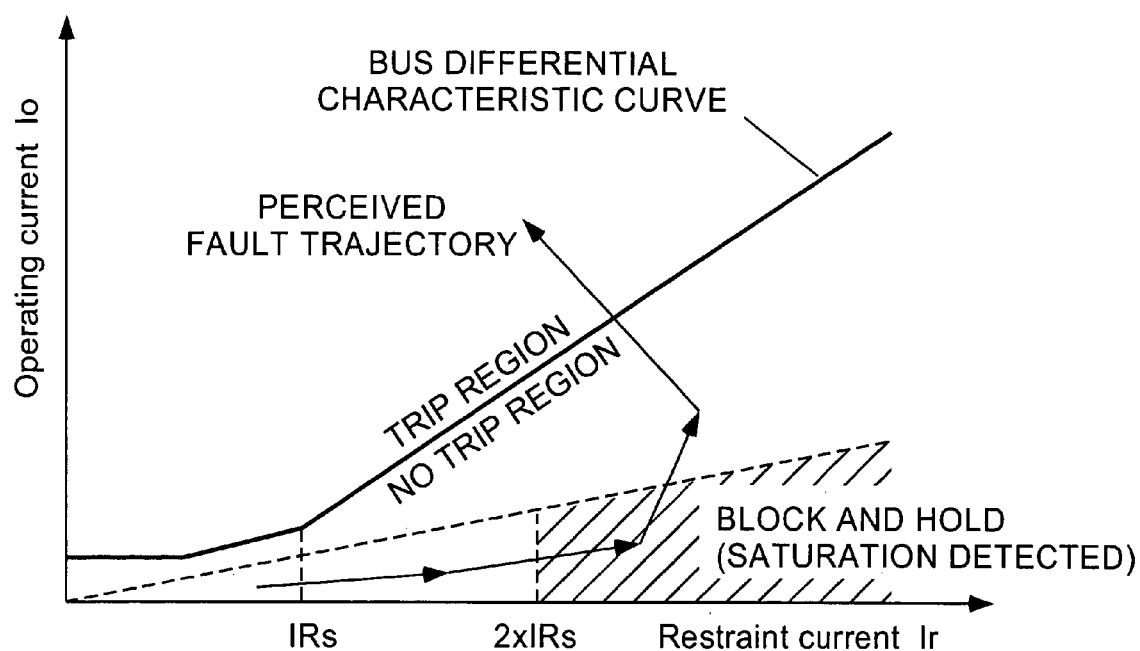
FIG. 3 is a graphical depiction of block and hold region of the bus protection in accordance with the present invention to prevent false tripping in the case where current transformer saturation occurs late after fault initiation.

FIG. 3 illustrates another aspect of the present invention, and is referred to by way of the last two blocks in block diagram illustrated in FIG. 2. To allow for the case where current transformer saturation occurs several cycles after fault initiation, a subsidiary BLOCK AND HOLD SIGNAL is generated. The BLOCK AND HOLD SIGNAL is indicative of the data pair consisting of the phasor sum signal Io and magnitude sum signal Ir falling within the shaded area of FIG. 3.

The BLOCK AND HOLD signal is a "trip blocking signal" that is held for several cycles beyond the time at which late saturation is detected, since otherwise, the perceived fault trajectory may cause a false trip.

The following mathematical descriptions depict the equations 1–4 referred to in the above exposition.

Equations 1—The Calculation of IO (Phasor Sum) and IR (Magnitude Sum)

The equations for the calculation of 10 and IR (for phase A, B, and C respectively)

$$IOa = \sum_{i=1}^{M} IA_i \quad IOb = \sum_{i=1}^{M} IB_i \quad IOc = \sum_{i=1}^{M} IC_i$$

-continued $$IRa = \frac{1}{2}\sum_{i=1}^{M} IA_i \quad IRb = \frac{1}{2}\sum_{i=1}^{M} IB_i \quad IRa = \frac{1}{2}\sum_{i=1}^{M} IC_i$$

where M is the number of power line inputs connected to the bus; IA, IB and IC are the fundamental power line current phasors (i.e. vector: a complex number).

Equations 2—The Calculation of Derivative of IO and IR $$dIOa\_dIt_n = dIOa\_dt_{n-1} \cdot \left(1 - \frac{\Delta t}{TW}\right) + \frac{(IOa_n - IOa_{n-1})}{TW} \cdot K$$

$$dIRa\_dIt_n = dIRa\_dt_{n-1} \cdot \left(1 - \frac{\Delta t}{TW}\right) + \frac{(IRa_n - IRa_{n-1})}{TW} \cdot K$$

The above equations are only showed for phase A current signals associated with connected or coupled loads and equipment currents. Similar equations may be expressed for phase B and phase C load and equipment currents as should be understood by those skilled in the art.

Where TW is a smoothing time constant, K is a scaling factor, and subscript "n" is an indication of the present value, and "n−1" is the value of one time step before. Δt is the time step.

Equations 3—The Calculation of the Second Harmonics Phasor of the Derivative of IO and IR $$HDft\_dIOa\_dt_n = \frac{2}{N} \cdot \sum_{i=0}^{N-1} dIOa\_dt_{n-i} \cdot e^{-j\frac{2\pi \cdot i}{N}}$$

$$HDft\_dIRa\_dt_n = \frac{2}{N} \cdot \sum_{i=0}^{N-1} dIRa\_dt_{n-i} \cdot e^{-j\frac{2\pi \cdot i}{N}}$$

where N is the half of the number of samples of the fundamental frequency, e.g., a 50 Hz or 60 Hz cycle. Phase B and Phase C are similar.

Equations 4—The Calculation of the Phase Difference Between $HDft\_dIO\_dt_n$ and $HDft\_dIR\_dt_n$ The phase difference is calculated through the product of $HDft\_dIO\_dt_n$ and the conjugate of $HDft\_dIR\_dt_n$, i.e.

$Dot\ ProdOfdIOa\_dIRa_n = HDft\_dIOa\_dt_n \cdot HDft\_dIRa\_dt_n *\{the\ conjugate\}$ $$\tan(Pha_n) = \frac{Im(ProdOfdIOa\_dIRa_n)}{Re(ProdOfdIOa\_dIRa_n)}$$

Where the superscript * represents the conjugate of a complex number, Im is to extract the imaginary part of the complex number, and Re is to extract the real part of the complex number.

When $\tan(Pha_n) > T$, issue a blocking signal to the differential protection function; otherwise do not block the differential protection. "T" is a preset value.

Phase B and Phase C are similar.

The bus protection system in accordance with the present invention includes a significant improvement to the traditional two slope differential characteristic that provides immunity to CT mismatch and minimal CT saturation sensitivity for external faults.

It should be recognized that the aforesaid calculations and signal processing may be accomplished digitally by way of simple programming within the exiting systems well within the level of those skilled in the art within existing common well known protection relays similar to those as already described without additional hardware, and the like.

We claim:

1. A protection relay for a power line system where current on a bus is provided to one or more power lines for receiving and generating power, and where associated with each of said power lines is a current transformer for providing a line signal representative of current flowing through a respective power line, and wherein said protection relay is operative for generating a fault trip signal in response to a detected power line fault, the protection relay comprising:
    a signal processor responsive to said line signals for generating a fault trip signal in response to a detected fault on any one of the power lines;
    means for summing said line signals, separately for each power line phase, for all power lines coupled to said bus and producing,
        a first signal indicative of the phasor sum of all line signals, and
        a second signal representative of the magnitude sum of said line signals;
    means for deriving,
        a first time derivative signal representative of the first derivative of said first signal, and
        a second time derivative signal representative of the first derivative of said second signal;
    means for deriving,
        a first harmonic signal representative of the a selected harmonic of said first time derivative signal, and
        a second harmonic signal representative of a selected harmonic of said second time derivative signal;
    means for determining the harmonic phase difference between said first and second harmonic signals;
    phase comparator means responsive to said harmonic phase difference for selectively generating a blocking signal for blocking said fault trip signal if said harmonic phase difference satisfies a first condition; and
    a trip signal generator means responsive to said first and second signals for generating a fault trip signal upon said first and second signals being beyond a defined bus differential characteristic conditioned upon the status of said blocking signal.

2. A protection relay for a power line system where current on a bus is provided to one or more power lines for receiving and generating power, and where associated with each of said power lines is a current transformer for providing a line signal representative of current flowing through a respective line, and wherein said protection relay is operative for generating a trip signal in response to a detected power signal line fault, the protection relay comprising:
    signal processor responsive to said line signals for generating a trip signal in response to a detected fault on any one of the power lines;
    means responsive to said line signals for detecting current transformer saturation; and
    means for selectively generating a blocking signal for blocking said trip signal in response to detection of current saturation of said current transformer.

3. A protection relay for a power line system where current on a bus is provided to one or more power lines for receiving and generating power, and where associated with each of said power lines is a current transformer for providing a line signal representative of current flowing through a respective line, and wherein said protection relay is operative for generating a fault trip signal in response to a detected power signal line fault, the protection relay comprising:
    a first signal processing means responsive to said line signals for generating a fault trip signal in response to a detected fault on any one of the power lines enabled upon the absence of a blocking signal; and
    a second signal processing means responsive to said line signals for,
        (i) detecting current transformer saturation; and
        (ii) for selectively generating said blocking signal for blocking said fault trip signal in response to detection of saturation of said current transformer occurring for less than a selected maximum block time.

4. The protection relay of claim 3 wherein said blocking signal is a function of (i) the first time derivative of the phasor sum of said line currents, and (ii) the first time derivative if the magnitude sum of said line currents.

5. A method for providing fault protection for power line systems where current on a bus is provided to one or more power lines for receiving and generating power, and where associated with each of said power lines is a current transformer for providing a line signal representative of current flowing through a respective line, and wherein said protection relay is operative for generating a fault trip signal in response to a detected power signal line fault, the method comprising the steps of:
    generating a fault trip signal in response to a detected fault on any one of the power lines conditioned upon the absence of a blocking signal;
    detecting saturation in response to said transformer line signal associated with any current transformer associated with any of said power lines; and
    selectively generating said blocking signal for blocking said fault trip signal in response to detection of said saturation of said current transformer occurring for less than a selected maximum block time.

6. The apparatus of claim 5 further including the steps of:
    (i) determining a first time derivative of the phasor sum of said line currents, and
    (ii) determining the first time derivative if the magnitude sum of said line currents.

7. A protection relay for a power line system where current on a bus is provided to one or more power lines for receiving and generating power, and where associated with each of said power lines is a current transformer for providing a line signal representative of current flowing through a respective power line, and wherein said protection relay is operative for generating a fault trip signal in response to a detected power line fault, the protection relay comprising:
    a signal processor responsive to said line signals for detecting a fault associated with any one power line and generating a fault trip signal in response thereto;
    means for summing said line signals, separately for each power line phase, for all power lines coupled to said bus and producing, a first signal indicative of the phasor sum of all line signals, and a second signal representative of the magnitude sum of said line signals;

signal processing means for deriving,
   a first time derivative signal representative of the first derivative of said first signal, and
   a second time derivative signal representative of the first derivative of said second signal;
means for deriving,
   a first harmonic signal representative of the a selected harmonic of said first time derivative signal, and
   a second harmonic signal representative of a selected harmonic of said second time derivative signal;
means for determining the harmonic phase difference between said first and second harmonic signals;

a signal phase comparator responsive to said harmonic phase difference for selectively generating a blocking signal for blocking said fault trip signal if said harmonic phase difference satisfies a first condition; and a trip signal generator responsive to said first and second signals for generating a fault trip signal upon said first and second signals being beyond a defined bus differential characteristic conditioned upon the status of said blocking signal.

\* \* \* \* \*